US 7,502,356 B2

(12) United States Patent
Lee et al.

(10) Patent No.: US 7,502,356 B2
(45) Date of Patent: Mar. 10, 2009

(54) APPARATUS AND METHOD FOR DETECTING TRAFFIC CHANNEL SIGNAL TRANSMISSION IN A RAKE RECEIVER

(75) Inventors: Ji-Ha Lee, Seoul (KR); Ji-Won Lee, Seongnam-si (KR); Sung-Kwon Jo, Suwon-si (KR); Sung-Hwan Ong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 11/180,789

(22) Filed: Jul. 14, 2005

(65) Prior Publication Data
US 2006/0013163 A1      Jan. 19, 2006

(30) Foreign Application Priority Data
Jul. 15, 2004      (KR) ...................... 10-2004-0055294

(51) Int. Cl.
  *H04B 7/216*      (2006.01)
(52) U.S. Cl. ....................... 370/342; 375/148
(58) Field of Classification Search ................. 375/148; 370/328, 310
See application file for complete search history.

(56) References Cited

U.S. PATENT DOCUMENTS

2003/0214355 A1\* 11/2003 Luz et al. ................ 330/124 R
2004/0196891 A1\* 10/2004 Tapaninen .................. 375/148

\* cited by examiner

*Primary Examiner*—Lester Kincaid
*Assistant Examiner*—Steven Lim
(74) *Attorney, Agent, or Firm*—Roylance, Abrams, Berdo & Goodman, L.L.P.

(57) ABSTRACT

An apparatus and a method for detecting traffic channel signal transmission in a rake receiver may advantageously ensure stable and accurate detection performance in performing continuous/discontinuous transmission detection of traffic channels with a rake receiver in a mobile communication system based upon CDMA 2000 standards by making sufficiently spaced distribution in traffic channel signal-to-noise ratios estimated in continuous/discontinuous transmission. The method includes compensating traffic channel signals according to fingers, respectively, by using estimated pilot channel signals; combining the compensated finger-based traffic channel signals and estimating signal-to-noise ratios for traffic channels; and comparing the estimated signal-to-noise ratios with a preset threshold value, respectively, to detect continuous or discontinuous transmission of the traffic channels based upon comparison results.

24 Claims, 5 Drawing Sheets

APPARATUS AND METHOD FOR DETECTING TRAFFIC CHANNEL SIGNAL TRANSMISSION IN A RAKE RECEIVER

CLAIM OF PRIORITY

This application claims the benefit under 35 U.S.C. §119 (a) from an application filed in the Korean Intellectual Property Office on Jul. 15, 2004, Ser. No. 2004-55294, the entire disclosure of which is hereby incorporated by reference.

BACKGROUND OF THE INVENTION

1. Field of the Invention

The present invention relates to a rake receiver, and more particularly, to an apparatus and a method for detecting traffic signal transmission in a rake receiver in a CDMA 2000 based mobile communication system in order to detect signal transmission in a traffic channel supporting a discontinuous transmission (DTX) mode.

2. Description of the Related Art

CDMA provides a rake reception function as one of several major characteristics. A rake receiver refers to a receiver capable of separating two signals having a time difference (delay). This function of the receiver can be obtained based upon spread spectrum principle of CDMA.

Multipath fading is a factor having a significant influence on transmission quality in electromagnetic communication. Multipath fading is produced by phase difference (time delay) in signals which have arrived at a receiver through different paths or channels. Such fading decreases the size of a signal which deteriorates Carrier-to-Interference (C/I) ratio, thereby concentrically producing transmission errors.

In addition, time delay creates Inter-Symbol Interference (ISI). Most electromagnetic communication techniques generally overcome fading by using diversity while reducing ISI due to time delay by using an equalizer that compensates for time delay.

Reasons for using a rake receiver in CDMA are as follows. First, it is assumed that three signals have arrived at a receiver at different times through three paths, as shown in FIG. 1. It will be also assumed that path 2 signal has a delay of about 0.5 chip, and path 3 signal has a delay of about 2 chips with respect to channel 1. A chip is an interval of one pulse in spreading code, and discriminated from data bit. One chip is 0.814 μS since CDMA has a spreading rate of 1.2288.

If the rake receiver performs despreading in synchronization with path 1 signal, path 2 and 3 signals are not despread since they are asynchronous with path 1 signal. It is because asynchronous signals are the same when multiplied with different signals or different codes as described above. That is, even though the same three signals arrived with different time delays, only path 1 signal can be decoded through despreading, while other signals which arrived through different paths are not despread. That is, only path 1 signal is extracted from the three signals. Accordingly, if delay of 2 chips is presumed to be synchronous with path 3 instead of path 1, only path 3 signal can be extracted at this time.

That is, CDMA can obtain an effect of time diversity by recognizing signals received with time difference as independent signals. A receiver capable of separating signals which arrive through different paths (or having time differences) as described above is called a rake receiver.

However, as shown in FIG. 1, if a time delay difference between two signals is shorter than 1 chip as in path 1 and path 2, the rake receiver cannot execute signal separation. This, as a result, causes harmful effects to signals. In a mobile communication environment (e.g., a macrocell having a cell radius of about 5 to 20 km), outdoor delay characteristics are reportedly about 2 μs to 3 μs. So, the rake receiver can provide large effects in this environment. However, large effects cannot be produced in a microcell environment or an indoor environment where a time delay is about 0.2 μs. In order to obtain sufficient effect by the rake receiver also in the indoor environment, spreading bandwidth of at least 50 MHz is required.

Description will now be made of a typical rake receiver and its operations with reference to FIG. 2.

FIG. 2 is a block diagram illustrating the concept of a typical rake receiver.

As shown in FIG. 2, a rake receiver includes a plurality of fingers 210, 220 and 230, a plurality of buffers 240, 250 and 260 and a combiner 270. Although three fingers 3 are illustrated, the number of fingers can be selectively increased.

Signals received by a receiving point 200 are input to fingers 210, 220 and 230, respectively, despread and channel-compensated by the fingers 210, 220 and 230, and then as symbols, sent to the combiner.

Each of the fingers 210, 220 and 230 includes a code generator 211 and a despreader 212 as shown in FIG. 2.

When the despreader 212 produces a symbol by despreading an input signal from the receiving point 200 in response to the input of despreading codes generated by the code generator 211, the finger 210 stores the symbol into the buffer 240. The same procedures are performed in the fingers 220 and 230 and the buffers 250 and 260 also.

Since symbols from the fingers 210, 220 and 230 have time differences, they are temporarily stored in buffers 240, 250 and 260 corresponding to the fingers 210, 220 and 230, respectively.

The symbol combiner 270 serves to combine the symbols stored in the buffers 240, 250 and 260 by synchronizing their times.

In the meantime, CDMA 2000 supports discontinuous transmission in a specific traffic channel such as a Dedicated Control Channel (DCCH) and a Supplemental Channel (SCH). That is, it is possible to execute continuous transmission (CTX) or discontinuous transmission in traffic channels according to whether or not data to be transmitted exist in the traffic channels while executing continuous transmission in Pilot Channels (PCH).

Since a transmitting section decides on continuous/discontinuous transmission, a receiving section has to estimate continuous/discontinuous transmission based upon a signal-to-noise ratio in a received signal.

Besides, in order to obtain multi-path diversity gains, CDMA 2000 performs power control based upon a signal-to-noise ratio of a combined signal of signals received via respective finger paths in a rake receiver. So, CDMA 2000 estimates continuous/discontinuous transmission of a traffic channel based upon signal-to-noise ratio obtained by combining the signals received according to the fingers.

However, in detecting continuous/discontinuous transmission of the traffic channel by using the signal-to-noise ratio as above, a signal-to-noise ratio in continuous transmission does not have sufficiently spaced distribution compared to that in discontinuous transmission. Therefore, as one of the drawbacks, there is high error rate.

SUMMARY OF THE INVENTION

The present invention has been made to, inter alia, address the foregoing problems of the prior art, and therefore, one of the objects of the present invention is to provide an apparatus and a method for detecting traffic signal transmission in a rake receiver in a CDMA 2000 based mobile communication system in order to detect signal transmission in a traffic channel supporting a discontinuous transmission (DTX) mode.

According to an exemplary aspect of the invention, there is provided a method for detecting traffic channel signal transmission in a rake receiver, the method comprising steps of: compensating traffic channel signals according to fingers, respectively, by using estimated pilot channel signals; combining the compensated finger-based traffic channel signals and estimating signal-to-noise ratios for traffic channels; and comparing the estimated signal-to-noise ratios with a preset threshold value, respectively, to detect continuous or discontinuous transmission of the traffic channels based upon comparison results.

According to another exemplary aspect of the invention, the estimating step of signal-to-noise ratios for traffic channels comprises: processing square calculation to the combined finger-based traffic channel signals.

According to another exemplary aspect of the invention, the detecting step comprises: determining continuous transmission of a traffic channel if an estimated signal-to-noise ratio for the traffic channel is at least a threshold value, and determining discontinuous transmission of a traffic channel if the estimated signal-to-noise ratio for the traffic channel is smaller than the threshold value.

According to another exemplary aspect of the invention, there is provided a method for detecting traffic channel signal transmission in a rake receiver, the method comprising steps of: compensating channels of UWN signals and traffic channel signals according to fingers, respectively, by using estimated pilot channel signals; combining the compensated finger-based traffic channel signals and the UWN signals and estimating signal-to-noise ratios for traffic channels and the UWN signals; and detecting continuous or discontinuous transmission of the traffic channels based upon the estimated signal-to-noise ratios, respectively.

According to another exemplary aspect of the invention, the estimating step of signal-to-noise ratios for traffic channels and the UWN signals comprises: processing square calculation to the combined finger-based traffic channel and UWN signals.

According to another exemplary aspect of the invention, the step of detecting continuous or discontinuous transmission of the traffic channels comprises: dividing the signal-to-noise ratios of the traffic channels with the signal-to-noise ratios of the UWN signals; comparing the divided signal-to-noise ratios with a threshold value to detect continuous or discontinuous transmission of the traffic channels based upon comparison results.

According to another exemplary aspect of the invention, the detecting step comprise: determining continuous transmission of a traffic channel if a divided signal-to-noise ratio is at least the preset threshold value, and determining discontinuous transmission of the traffic channel if the divided signal-to-noise ratio is smaller than the preset threshold value.

According to another exemplary aspect of the invention, there is provided a method for detecting traffic channel signal transmission in a rake receiver, the method comprising steps of: compensating channels of UWN signals and traffic channel signals according to fingers, respectively, by using pilot channel signals estimated according to the fingers; combining the compensated finger-based traffic channel signals and the UWN signals, and processing square calculation to the combined finger-based traffic channel and UWN signals, respectively, to estimate signal-to-noise ratios for traffic channels and the UWN signals, respectively; and detecting continuous or discontinuous transmission of the traffic channels based upon the estimated signal-to-noise ratios for the estimated traffic channel signals and the UWN signals, respectively, wherein the step of detecting continuous or discontinuous transmission of the traffic channels comprises: dividing the signal-to-noise ratios of the traffic channels with the signal-to-noise ratios of the UWN signals; comparing the divided signal-to-noise ratios with a threshold value to detect continuous or discontinuous transmission of the traffic channels based upon comparison results and determining continuous transmission of a traffic channel if a divided signal-to-noise ratio is at least the preset threshold value and discontinuous transmission of the traffic channel if the divided signal-to-noise ratio is smaller than the preset threshold value.

According to another exemplary aspect of the invention, there is provided an apparatus for detecting traffic channel signal transmission in a rake receiver, comprising: a channel compensator for compensating traffic channel signals according to fingers, respectively, by using estimated pilot channel signals; a signal-to-noise ratio estimator for combining the compensated finger-based traffic channel signals to estimate signal-to-noise ratios for traffic channels; and a transmission mode determining means for comparing the estimated signal-to-noise ratios with a preset threshold value, respectively, to detect continuous or discontinuous transmission of the traffic channels based upon comparison results.

According to other exemplary aspect of the invention, there is provided an apparatus for detecting traffic channel signal transmission in a rake receiver, comprising: a channel compensator for compensating channels of UWN signals and traffic channel signals according to fingers, respectively, by using estimated pilot channel signals; an SNR estimator for combining the compensated finger-based traffic channel signals and the finger-based UWN signals and estimating signal-to-noise ratios for traffic channels and the UWN signals; and a transmission mode determining means for determining continuous or discontinuous transmission of the traffic channels based upon the estimated signal-to-noise ratios, respectively.

According to another exemplary aspect of the invention, the channel compensator includes: a finger-based traffic channel compensator for compensating the traffic channel signals according to the fingers by using the pilot channel signals estimated according to the fingers; and a finger-based UWN channel compensator for compensating the UWN signals according to the fingers by using the pilot channel signals estimated according to the fingers.

According to another exemplary aspect of the invention, the SNR estimator includes: first and second combiners for combining the finger-based traffic channel and UWN signals compensated by the channel compensator, respectively; and first and second SNR estimators for estimating signal-to-noise ratios with respect to the traffic channel and UWN signals combined by the first and second combiners, respectively.

According to another exemplary aspect of the invention, the signal-to-noise ratios with respect to the traffic channel and UWN signals estimated by the first and second SNR estimators, respectively, are estimated by square-calculating the traffic channel and UWN signals combined in the first and second combiners, respectively.

According to another exemplary aspect of the invention, the transmission mode determining means includes: a divider for dividing the signal-to-noise ratios of the traffic channels estimated by the SNR estimators with the signal-to-noise ratios of the UWN signals; and a determining section for comparing the divided signal-to-noise ratios divided by the divider with a threshold value to detect continuous or discontinuous transmission of the traffic channels based upon comparison results.

According to yet another exemplary aspect of the invention, there is provided an apparatus for detecting traffic channel signal transmission in a rake receiver, comprising: a pilot channel estimator for estimating received pilot channel signals according to fingers; a channel compensator for compensating traffic channel signals according to fingers, respectively, by using the pilot channel signals estimated in the pilot channel estimator; a UWN channel compensator for compensating the UWN signals according to the fingers by using the pilot channel signals estimated according to the fingers; a first coupler for combining the finger-based traffic channel signals compensated by the channel compensator, respectively; a second coupler for combining the finger-based traffic channel signals compensated by the channel compensator, respectively; a first SNR estimator for estimating signal-to-noise ratios of the traffic channels by square-calculating the traffic channel signals combined by the first combiners, respectively; a second SNR estimator for estimating signal-to-noise ratios of the traffic channels by square-calculating the traffic channel signals combined by the first combiners, respectively; and a transmission mode determining means for determining continuous or discontinuous transmission of the traffic channels based upon the signal-to-noise ratios estimated by the first and second SNR estimators, respectively.

BRIEF DESCRIPTION OF THE DRAWINGS

A more complete appreciation of the exemplary embodiments of the present invention, and many of the attendant advantages thereof, will be readily apparent by reference to the following detailed description when considered in conjunction with the accompanying drawings, in which like reference symbols indicate the same or similar components, wherein.

DETAILED DESCRIPTION OF EXEMPLARY EMBODIMENTS

The following detailed description will present an apparatus and a method for detecting traffic channel signal transmission in a rake receiver according to exemplary embodiments of the present invention with reference to the accompanying drawings.

Figure 1:
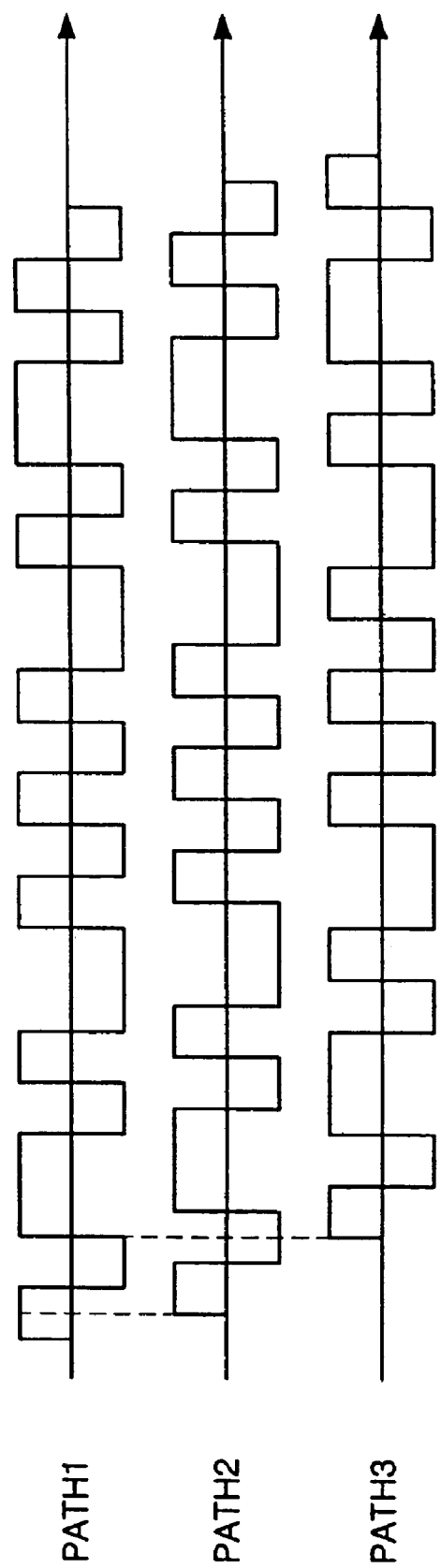
FIG. 1 illustrates waveforms of signals that a general rake receiver receives through multipaths.
Figure 2:
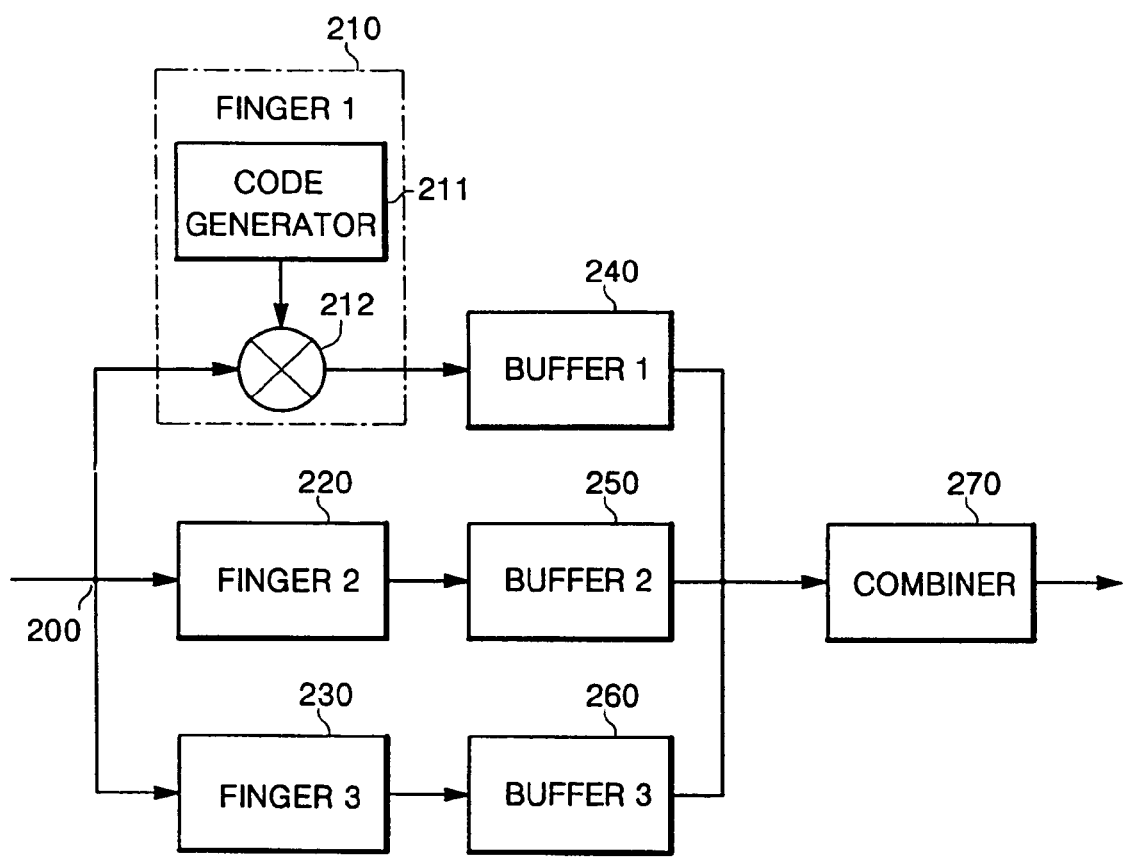
FIG. 2 is a block diagram illustrating the concept of a general rake receiver.
Figure 3:
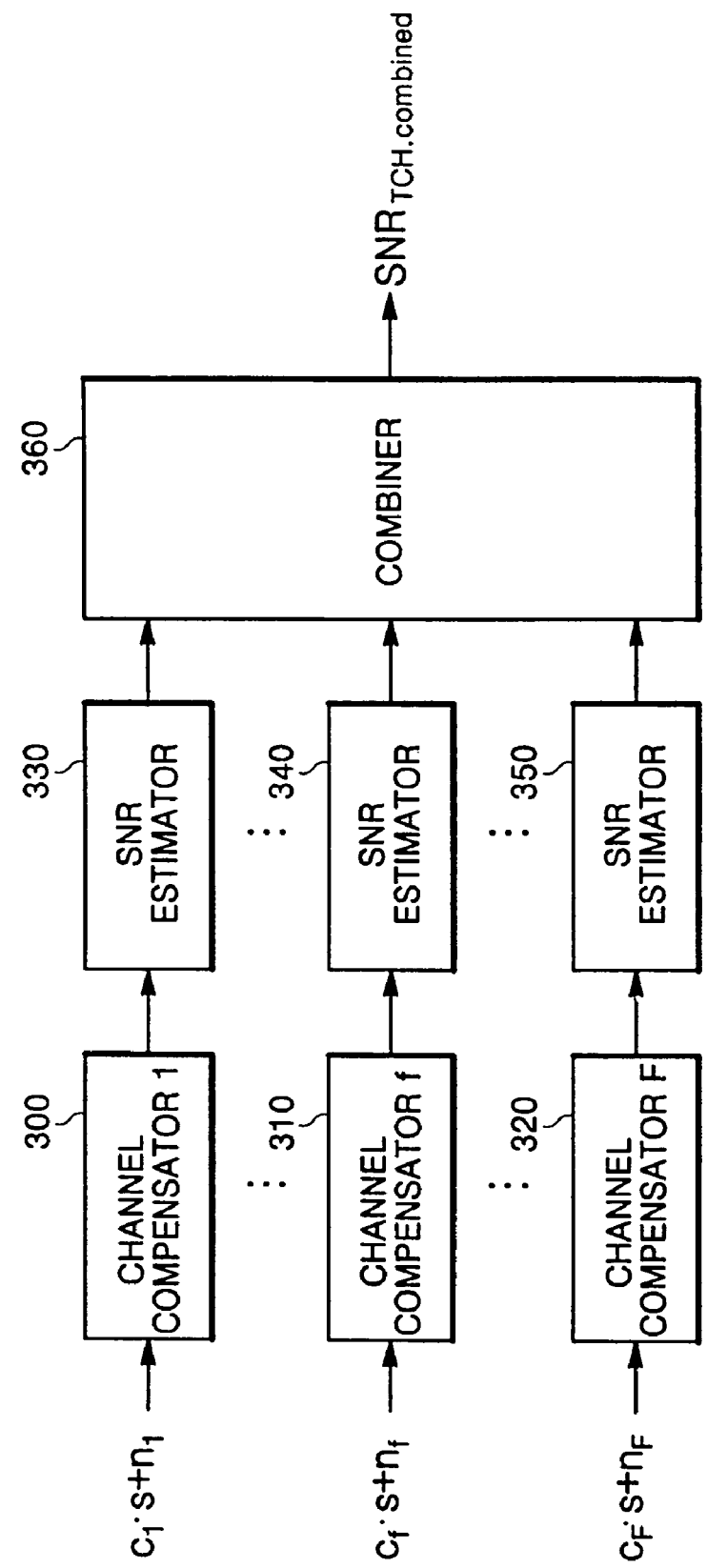
FIG. 3 is a block diagram of a general signal-to-noise detector for illustrating an apparatus for detecting traffic channel signal transmission in a rake receiver according to an exemplary embodiment of the present invention.

FIG. 3 is a block diagram of a general signal-to-noise detector for illustrating an apparatus for detecting traffic channel signal transmission in a rake receiver according to the invention.

As shown in FIG. 3, the apparatus for detecting traffic channel signal transmission in a rake receiver includes channel compensators 300, 310 and 320, signal-to-noise ratio estimators 330, 340 and 350 and a combiner 360, in which the channel compensators 300 to 320 and the estimators 330 to 350 are provided according to receiving channels or fingers.

When the rake receiver receives a traffic channel symbol s which is transmitted from a transmitting point through paths c and added with noise signals n, signals received by the individual rake fingers can be expressed, for example, by $c_1^*s+n_1$, $c_f^*s+n_f$ and $c_F^*s+n_F$, wherein F indicates the number of effective receiving paths in the rake receiver.

Signals received as above are cleared of channel influences through channel compensation in the channel compensators 300, 310 and 320, and then provided to the signal-to-noise ratio estimators 330, 340 and 350, which estimate powers of the signals to estimate signal-to-noise ratios of the individual fingers.

When the signal-to-noise ratios of the individual fingers are estimated, the combiner 360 combines the signal-to-noise ratios of the individual fingers so as to estimate traffic channel signal-to-noise ratio $SNR_{TCH.Combined}$. The traffic channel signal-to-noise ratio is a function of traffic channel power corresponding to traffic channel symbol s power, pilot channel (PCH) power corresponding to path c power and noise power corresponding to added noise n power. That is, the traffic channel signal-to-noise ratio can be expressed by Equation 1 below:

$$SNR_{TCH.Combined} = fn_p(\text{traffic channel power, noise power}) + fn_Q(PCH \text{ power, noise power}) \quad \text{Equation 1,}$$

wherein $fn_n\{A, B\}$ indicates a function X expressed by factors A and B, with $fn_p\{\text{traffic channel power, noise power}\}=0$ for traffic channel discontinuous transmission. In case of discontinuous transmission, $fn_p\{\text{traffic channel power, noise power}\}$ is given equally and the traffic channel signal-to-noise ratio can be expressed by Equation 2 below:

$$SNR_{TCH.Combined}|_{DTX} = fn_Q(PCH \text{ power, noise power}) \quad \text{Equation 2.}$$

$SNR_{TCH.Combined}|_{DTX}$ of Equation 2 is given equal with $SNR_{TCH.Combined}$ estimated by a PCH, and thus has a relation as expressed by Equation 3 below:

$$SNR_{TCH.Combined}|_{DTX} = SNR_{PCH.Combined} \quad \text{Equation 3.}$$

From the relation of Equation 3, continuous/discontinuous transmission of traffic channel can be detected generally as expressed by Equation 4 below:

$$\text{Decision Metric} = \frac{SNR_{TCH.combined}}{SNR_{PCH.combined}} > TH, \quad \text{Equation 4}$$

wherein TH is a boundary or threshold value determined in consideration of the distribution of traffic channel power and pilot channel (PCH) power, in which a divided value of the traffic channel signal-to-noise ratio by the pilot channel signal-to-noise ratio at least the threshold value TH indicates continuous transmission (CTX) and a divided value smaller than the threshold value indicates discontinuous transmission (DTX).

However, the signal-to-noise ratio of Equation 1 corresponding to continuous transmission of $fn_p\{\text{traffic channel power, noise power}\}\neq 0$ does not have sufficiently spaced distribution compared to the signal-to-noise ratio of Equation 2 owing to influences of added noise distribution, multi-path fading and so on. As a result, this has drawbacks of high error rate in detection according to FIG. 3 and Equation 4.

Accordingly, in order to solve the above drawbacks, the apparatus and the method for detecting traffic channel signal transmission in a rake receiver according to exemplary embodiments of the invention are devised, as will be described in detail with reference to the accompanying drawings.

Figure 4:
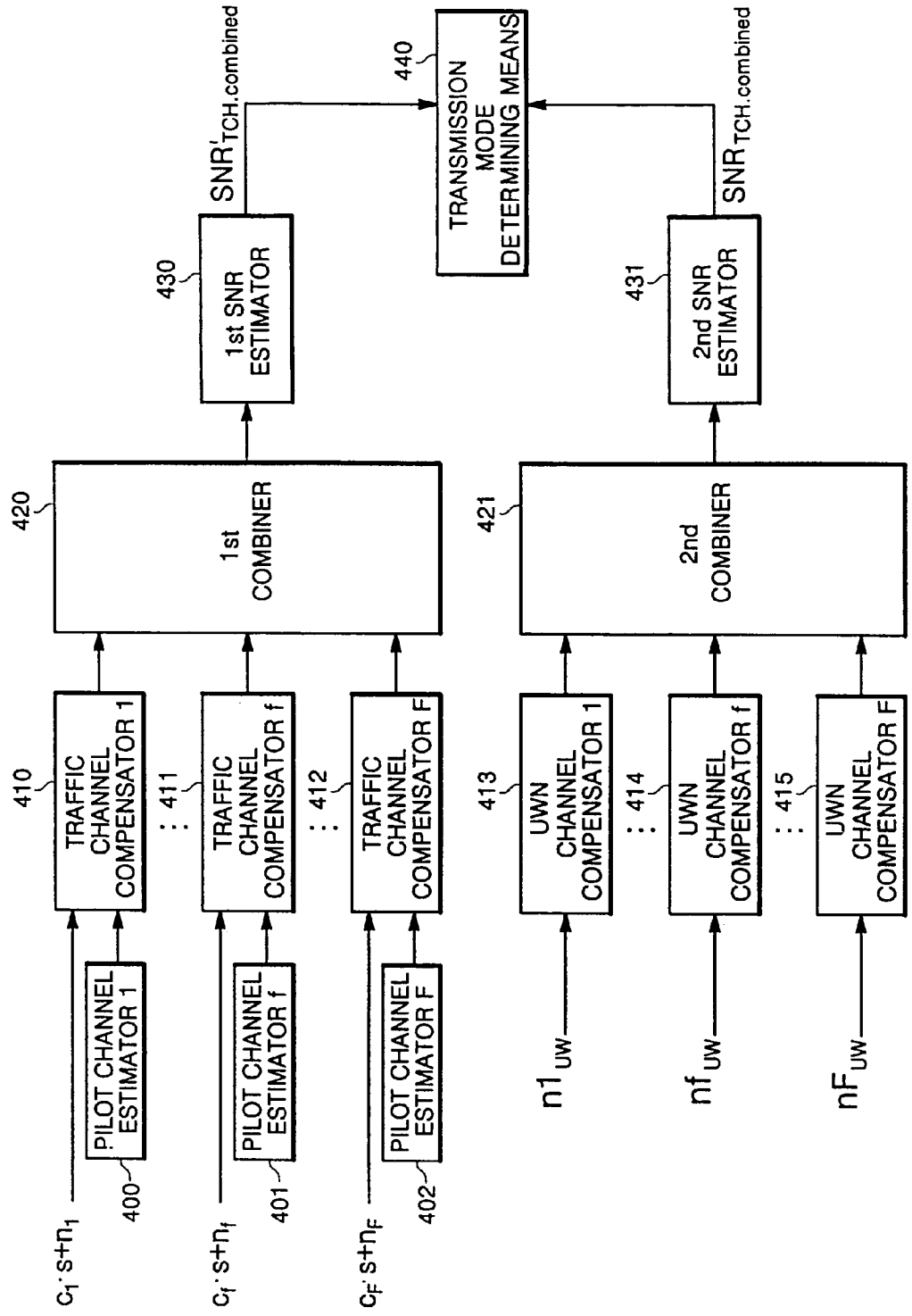
FIG. 4 is a block diagram of an apparatus for detecting traffic channel signal transmission in a rake receiver according to an exemplary embodiment of the present invention.

FIG. 4 is a block diagram of an apparatus for detecting traffic channel signal transmission in a rake receiver according to an exemplary embodiment of the present invention.

As shown in FIG. 4, the apparatus for detecting traffic channel signal transmission in a rake receiver includes pilot channel estimators (1, f, F) 400, 401 and 402 according to fingers, traffic channel compensators (1, f, F) 410, 411 and 412, Unused Walsh Noise (UWN) channel compensators (1, f, F) 413, 414 and 415, first and second combiners 420 and 421, first and second SNR estimators 430 and 431 and a transmission mode determining module 440.

The finger-based pilot channel estimators 400, 401 and 402 receive pilot channel signals according to the fingers to estimate channels according to the fingers, respectively, and provide estimated channel signals to the traffic channel compensators 410, 411 and 412 and the UWN channel compensators 403, 404 and 405, respectively. UWN is the per-finger noise signal generated from the received signal covered by the specific walsh code which is not used for any other channels including the traffic and the overhead channels.

The traffic channel compensators 410, 411 and 412 compensate the received traffic channel signals according to the fingers in response to pilot signal estimation signals provided from the pilot signal estimators 400, 401 and 402. When the rake receivers has received a traffic channel symbol s transmitted along channels c and added with noise signals n are added, the traffic channel signals received by the rake fingers may be expressed as $c_1{}^*s+n_1$, $c_f{}^*s+n_f$ and $c_F{}^*s+n_F$, respectively. Herein, F indicates the number of effective reception channels in the rake receiver.

When the traffic channels according to the fingers are compensates as above, the first combiner 420 combines compensation signals together, and a combined value is provided to the first SNR estimator 430.

The first SNR estimator 430 processes square calculation of the traffic signals provided from the first combiner 420 to estimate signal-to-noise ratio $SNR'_{TCH.combined}$ for the traffic channel signals, and then provides the estimated signal-to-noise ratio for the traffic channels to the transmission mode determining module 440. Herein, the estimated signal-to-noise ratio for the traffic channels may be expressed by Equation 5 below:

$$SNR'_{TCH.Combined} = fn_P(\text{traffic channel noise, noise power}) + \quad \text{Equation 5}$$
$$fn_Q(PCH \text{ power, noise power}) +$$
$$\sum_{f \neq i}^{F} \sum_{i}^{F} IFSC(f, i|c, \text{noise power}) +$$
$$\sum_{f \neq i}^{F} \sum_{i}^{F} IFNC(f, i|c, \text{noise power}),$$

wherein IFSC(f, i|c, noise power) indicates Inter-Finger Signal Correlation for noise and traffic channel signal components of the respective fingers, and IFNC(F, i|c, noise power) indicates Inter-Finger Noise Correlation for noise components for the respective fingers, which are applied with a weight by the channel component c. In case of discontinuous transmission, a term related with traffic channel power is removed from Equation 5. Signal-to-interference ratio can be expressed by Equation 6 below:

$$SNR'_{TCH.Combined}|_{DTX} = fn_Q(PCH \text{ power, noise power}) + \quad \text{Equation 6}$$
$$\sum_{f \neq i}^{F} \sum_{i}^{F} IFNC(f, i|c, \text{noise power}).$$

From Equation 5 above, it can be understood that, in case of continuous transmission, a term related with traffic channel power is larger by ΣΣIFSC(f, i|c, noise power) compared to a traffic channel power term. In case of discontinuous transmission, it is sized different by ΣΣIFNC(f, i|c, noise power) as in Equation 6 above. In addition, ΣΣIFNC(f, i|c, noise power) may be expressed by a different value according to effective channel number F of the rake receiver and the noise distribution of the respective channels. That is, ΣΣIFNC(f, i|c, noise power) may be expressed by Equations 7 and 8 below:

$$fn_P(\text{traffic channel power, noise power}) + \quad \text{Equation 7}$$
$$\sum_{f \neq i}^{F} \sum_{i}^{F} IFSC(f, i|c, \text{noise power}) >$$
$$fn_P(\text{traffic channel power, noise power}).$$

$$SNR'_{TCH.Combined}|_{DTX} = \quad \text{Equation 8}$$
$$SNR_{TCH.Combined}|_{DTX} + \sum_{f \neq i}^{F} \sum_{i}^{F} IFNC(f, i|c, \text{noise power}).$$

Apparently, it is necessary to remove IFNC(f, i|c, noise power) while maintaining IFSC(f, i|c, noise power) so that signal-to-noise ratio in case of continuous transmission (CTX) maintains sufficient space with respect to signal-to-noise ratio in discontinuous transmission. In order to remove the effect of IFNC(f, i|c, noise power) while maintaining IFSC(f, i|c, noise power), as shown in FIG. 4, an Unused Walsh Noise UWN power estimator is used.

That is, the UWN channel compensators 413, 414 and 415 according to the fingers compensates the channels according to the fingers by using UWN signals $n1_{UW}$, $nf_{UW}$ and $nF_{UW}$ and channel estimation signals provided by the finger-based pilot channel estimators 400, 401 and 402. The channel compensation for the estimated per-finger noise signals such as UWN is required because the IFNC component is expressed by the weighted noise signal by channel "c". The noise signal weighted by channel c is inevitably introduced due to the process of the squaring the channel-compensated combined signal.

The finger-based channel compensation signals compensated as above are provided to the second combiner 421, which combines the channel compensation signals, and a combined estimation signal is provided to the second SNR estimator 431.

The second SNR estimator 431 executes square calculation of a signal provided from the second combiner 421 to estimate a signal-to-noise ratio ($SNR_{UW.combined}$) for a UWN signal.

Herein, the signal-to-noise ratio for a UWN signal can be expressed by Equation 9 below:

$$SNR'_{UW.Combined} = fn_Q(PCH \text{ power, noise power}) + \sum_{f \neq i}^{F} \sum_{i}^{F} IFNC(f, i|c, \text{noise power}).$$

Equation 9

The signal-to-noise ratio $SNR'_{TCH.combined}$ of a traffic channel signal and the signal-to-noise ratio $SNR'_{UW.combined}$ of a UWN signal estimated as above are provided to the transmission mode determining module 440, respectively.

By using the signal-to-noise ratio $SNR'_{TCH.combined}$ of a traffic channel signal provided from the first SNR estimator 430 and the signal-to-noise ratio $SNR'_{UW.combined}$ of a UWN signal provided from the second SNR estimator 431, the transmission mode determining module 440 determines whether the traffic channel is in a continuous or discontinuous transmission mode.

Herein, a decision metric for a continuous and discontinuous modes of the traffic channel can be determined by Equation 10 below:

$$\text{Decision Metric} = \frac{SNR'_{TCH.combined}}{SNR'_{UW.combined}} >_{(CTX)} \text{ or } <_{(DTX)} TH.$$

Equation 10

If the signal-to-noise value produced by dividing the signal-to-noise ratio $SNR'_{TCH.combined}$ of a traffic channel signal with the signal-to-noise ratio $SNR'_{UW.combined}$ is smaller than a preset threshold value TH, it is determined discontinuous transmission of traffic channels. On the contrary, if the signal-to-noise value produced by dividing the signal-to-noise ratio $SNR'_{TCH.combined}$ of a traffic channel signal with the signal-to-noise ratio $SNR'_{UW.combined}$ is at least the threshold value TH, it is determined continuous transmission of traffic channels.

When the continuous/discontinuous mode of traffic channels is detected according to Equation 10, owing to IFSC(f, i|c) term, the signal-to-noise ratio estimated in continuous/discontinuous transmission has a distribution of sufficient space, and a uniform detection threshold value (TH) irrespective of effective channel number F can be designed.

In correspondence with the operation of the apparatus for detecting traffic channel signal transmission in a rake receiver according to an exemplary embodiment of the invention, stepwise description will now be made of an exemplary method for detecting traffic channel signal transmission in a rake receiver according to an exemplary embodiment of the present invention with reference to FIG. 5.

Figure 5:
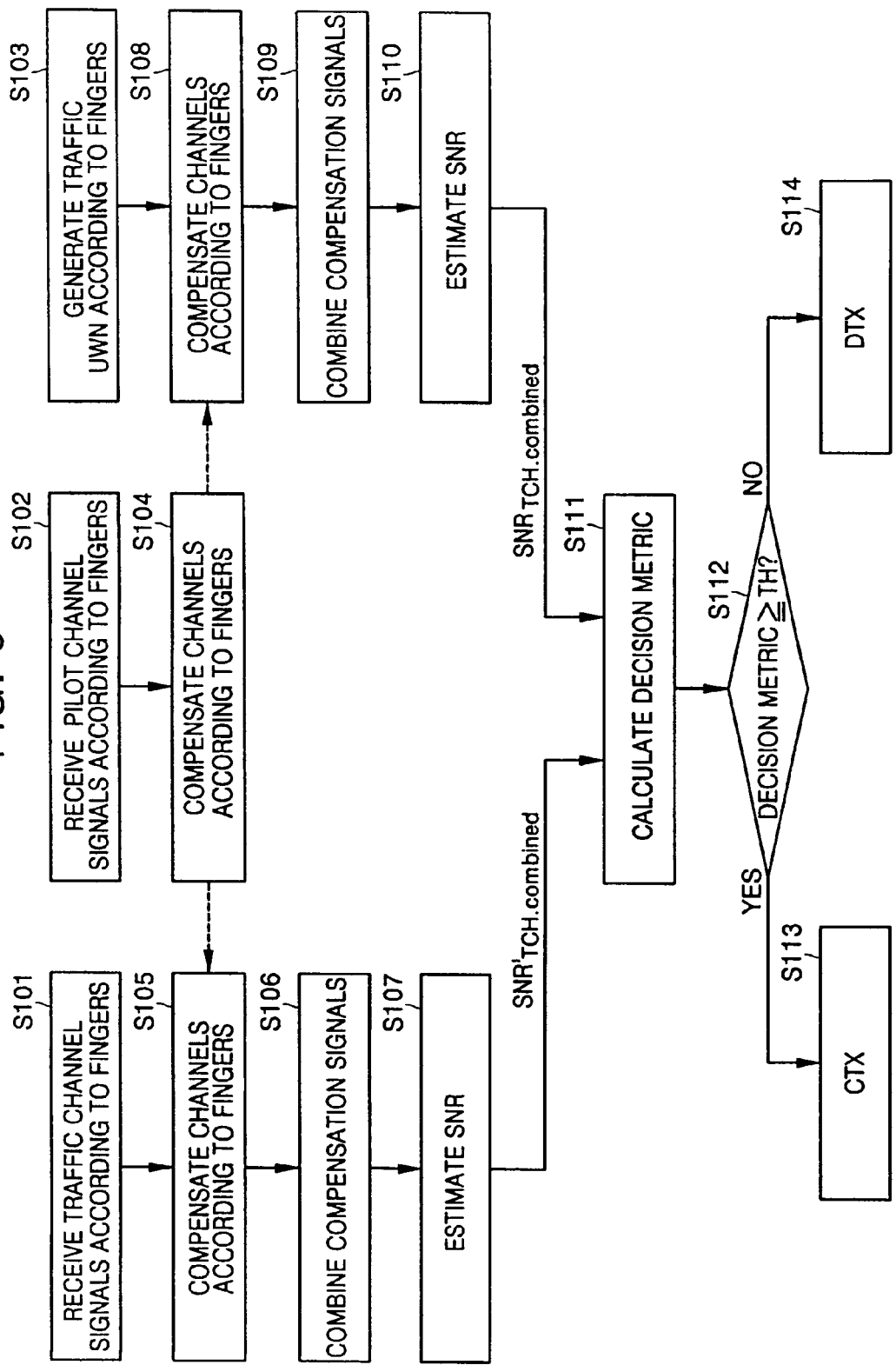
FIG. 5 is a flowchart of a method for detecting traffic channel signal transmission in a rake receiver according to an exemplary embodiment of the present invention.

FIG. 5 is a flowchart of an exemplary method for detecting traffic channel signal transmission in a rake receiver according to an exemplary embodiment of the present invention.

As shown in FIG. 5, in S102 and S104, pilot channel signals according to fingers are received, and channels are estimated by using the finger-based pilot channel signals.

When the finger-based traffic channel signals are received, the received traffic channel signals are compensated with channels by using the estimated finger-based pilot channel signals in S101 and S105.

In the meantime, UWN signals are generated according to channels, and compensated with channels by using the estimated pilot channel signals in S103 and S108.

Upon being compensated with channels in S105, the traffic channel signals are combined in S106, and signal-to-noise ratios of traffic channels are estimated by processing square calculation to a combined traffic channel compensation signal in S107. Herein, the signal-to-noise ratios of traffic channels can be calculated by using Equation 5 above. If traffic channel signals are in a discontinuous transmission mode, it can be expressed by Equation 6 by subtracting a traffic channel-related term from Equation 5.

In addition, upon being compensated in S108 above, UWN channel compensation signals according to fingers are combined respectively in S109, and a combined UWN signal is processed with square calculation to estimate signal-to-noise ratios for the UWN signals in S110. Herein, the signal-to-noise ratios for the UWN signals can be expressed by Equation 9 above.

By using the signal-to-noise ratios for the traffic channels and the UWN signals like this, a decision metric capable of determining continuous and discontinuous transmission of the traffic channels is calculated in S111. The decision metric can be calculated by using Equation 10 above. That is, the decision metric is produced by dividing the signal-to-noise ratios for the traffic channel signals with the signal-to-noise ratios for the UWN signals.

In order to determine whether or not the traffic channels are in a continuous transmission (CTX) or discontinuous transmission (DTX) mode, the decision metric calculated above is compared with a preset threshold value in S112.

If the calculated decision metric is at least the predetermined threshold value, it is determined a continuous transmission mode of a traffic channel in S113. On the contrary, if the calculated decision metric value is smaller than the preset threshold value, it is determined a discontinuous transmission mode of a traffic channel in S114.

Summarizing an exemplary method for detecting traffic channel signal transmission in a rake receiver according to an embodiment of the present invention as described hereinbefore, traffic channels, pilot channels and unused Walsh noise signal paths channels are first separated according to fingers of the rake receiver.

Channel estimation is executed via pilot channels, and channel compensation with respect to the traffic channels and UWN signals are performed by using estimated channel signals.

Upon being compensated with channels, signals are combined with respect to all activated fingers, and square calculation is performed to combined compensation values to estimate signal-to-noise ratios.

Accordingly, by using the signal-to-noise ratios estimated from the traffic channels and the UWN signals, a decision metric is composed, and compared with a preset threshold value TH. If the decision metric is at least TH, it is determined continuous transmission CTX, and if the decision metric is smaller than TH, it is determined discontinuous transmission DTX.

The An exemplary apparatus and an exemplary method for detecting traffic channel signal transmission in a rake receiver according to exemplary embodiments of the present invention as described above may advantageously ensure stable and accurate detection performance in processing continuous/discontinuous transmission detection of traffic channels with a rake receiver in a mobile communication system based upon CDMA 2000 standards by making sufficiently spaced distribution in traffic channel signal-to-noise ratios estimated in continuous/discontinuous transmission.

While certain exemplary aspects of the present invention have been shown and described in connection with exemplary embodiments thereof, it will be apparent to those skilled in the art that modifications and variations can be made without departing from the spirit and scope of the invention as defined by the appended claims.

What is claimed is:

1. A method for detecting traffic channel signal transmission in a rake receiver, the method comprising steps of:

compensating traffic channel signals according to fingers using estimated pilot channel signals;

combining the compensated finger-based traffic, channel signals and estimating at least one signal-to-noise ratio for at least one traffic channel;

comparing the at least one of estimated signal-to-noise ratio with a preset threshold value to detect continuous or discontinous transmission of the at least one traffic channel based upon the comparing; wherein the estimating of the at least one signal-to-noise ratio for the at least one traffic channel comparises using:

$$SNR'_{TCH.Combined} = fn_P(\text{traffic channel noise, noise power}) +$$
$$fn_Q(PCH \text{ power, noise power}) + \sum_{f \neq i}^{F} \sum_{i}^{F} IFSC(f,$$
$$i|c, \text{ noise power}) + \sum_{f \neq i}^{F} \sum_{i}^{F} IFNC(f, i|c, \text{ noise power}),$$

wherein IFSC(f, i|c, noise power) indicates Inter-Finger Signal correlation for noise and traffic channel signal components of respective fingers, and IFNC(F, i|c, noise power) indicates Inter-Finger Noise Correlation for noise components for respective fingers which are applied wtth a weight by channel component c.

2. The method according to claim 1, wherein the estimating of the at least one signal-to-noise ratio for the at least one traffic channel comprises processing square calculation to the combined finger-based traffic channel signals.

3. The method according to claim 1, wherein if a traffic channel is of discontinuous transmission, the estimating step of the at least one signal-to-noise ratio for the at least one traffic channel comprises using:

$$SNR'_{TCH.Combined}|_{DTX} =$$
$$fn_Q(PCH \text{ power, noise power}) + \sum_{f \neq i}^{F} \sum_{i}^{F} IFNC(f, i|c, \text{ noise power}).$$

4. The method according to claim 1 further comprising:
determining continuous transmission of a traffic channel if an estimated signal-to-noise ratio for the traffic channel is at least a threshold value; and
determining discontinuous transmission of a traffic channel if the estimated signal-to-noise ratio for the traffic channel is smaller than the threshold value.

5. A method for detecting traffic channel signal transmission in a rake receiver, the method comprising steps of:

compensating channels of UWN signals and traffic channel signals according to fingers using estimated pilot channel signals;

combining the compensated finger-based traffic channel signals and the UWN signals and estimating at least one signal-to-noise ratio for at least one traffic channel and the UWN signals; and detecting continuous or discontinuous transmission of the at least one traffic channel based upon the at least one estimated signal-to-noise ratio, wherein the at least one signal-to-noise ratio for the at least one traffic channel comprises estimating using:

$$SNR'_{TCH.Combined} = fn_P(\text{traffic channel noise, noise power}) +$$
$$fn_Q(PCH \text{ power, noise power}) + \sum_{f \neq i}^{F} \sum_{i}^{F} IFSC(f,$$
$$i|c, \text{ noise power}) + \sum_{f \neq i}^{F} \sum_{i}^{F} IFNC(f, i|c, \text{ noise power}),$$

wherein IFSC(f, i|c, noise power) indicates Inter-Finger Signal Correlation for noise and traffic channel signal components of respective fingers, and IFNC(f, i|c, noise power) indicates Inter-Finger Noise Correlation for noise components for the respective fingers, which are applied with a weight by channel component c.

6. The method according to claim 5, wherein the estimating step of the at least one signal-to-noise ratio for the at least one traffic channel and the UWN signals comprises processing a square calculation to the combined finger-based traffic channel and UWN signals.

7. The method according to claim 5, wherein if a traffic channel is of discontinuous transmission, the estimating step of the at least one signal-to-noise ratio for the at least one traffic channel comprises using:

$$SNR'_{TCH.Combined}|_{DTX} =$$
$$fn_Q(PCH \text{ power, noise power}) + \sum_{f \neq i}^{F} \sum_{i}^{F} IFNC(f, i|c, \text{ noise power}).$$

8. The method according to claim 6, wherein the at least one signal-to-noise ratio of the UWN signals comprises estimating using:

$$SNR'_{UW.Combined} =$$
$$fn_Q(PCH \text{ power, noise power}) + \sum_{f \neq i}^{F} \sum_{i}^{F} IFNC(f, i \mid c, \text{ noise power}).$$

9. The method according to claim 5, wherein the step of detecting continuous or discontinuous transmission of the at least one traffic channel comprises:

dividing the at least one signal-to-noise ratio of the at least one traffic channel with at least one of the signal-to-noise ratios of at least one of the UWN signals; and comparing the divided signal-to-noise ratios with a threshold value to detect continuous or discontinuous transmission of the at least one traffic channel based upon the comparing.

10. The method according to claim 9, wherein the step of detecting continuous or discontinuous transmission of the at least one traffic channel further comprises determining continuous transmission of a traffic channel if a divided signal-to-noise ratio is at least the preset threshold value, and determining discontinuous transmission of the traffic channel if the divided signal-to-noise ratio is smaller than the preset threshold value.

11. A method for detecting traffic channel signal transmission in a rake receiver, the method comprising steps of:
   compensating channels of UWN signals and traffic channel signals according to fingers using pilot channel signals estimated according to the fingers;
   combining the compensated finger-based traffic channel signals and the UWN signals, and processing a square calculation of the combined finger-based traffic channel and UWN signals to estimate signal-to-noise ratios for traffic channels and the UWN signals, wherein the estimating of the at least one signal-to-noise ratio for the at least one traffic channel comprises using:

$$SNR'_{TCH\text{-}Combined} = fn_P(\text{traffic channel noise, noise power}) +$$
$$fn_Q(PCH \text{ power, noise power}) + \sum_{f \neq i}^{F}\sum_{i}^{F} IFSC(f, i \mid c, \text{noise power}) +$$
$$\sum_{f \neq i}^{F}\sum_{i}^{F} IFNC(f, i \mid c, \text{noise power}),$$

wherein IFSC(f, i|c, noise power) indicates Inter-Finger Signal Correlation for noise and traffic channel components of respective fingers, and IFNC(f, i|c, noise power) indicates Inter-Finger Noise Correlation for noise components for respective fingers, which are applies with a weight by channel component c; and
   detecting continuous or discontinuous transmission of the traffic channels based upon the estimated signal-to-noise ratios for the estimated traffic channel signals and the UWN signals,
   wherein the step of detecting continuous or discontinuous transmission of the traffic channels comprises:
   dividing the signal-to-noise ratios of the traffic channels with the signal-to-noise ratios of the UWN signals;
   comparing the divided signal-to-noise ratios with a threshold value to detect continuous or discontinuous transmission of the traffic channels based upon comparison results; and
   determining continuous transmission of a traffic channel if a divided signal-to-noise ratio is at least the preset threshold value and discontinuous transmission of the traffic channel if the divided signal-to-noise ratio is smaller than the preset threshold value.

12. An apparatus for detecting traffic channel signal transmission in a rake receiver, comprising:
   a channel compensator which compensates traffic channel signals according to fingers using estimated pilot channel signals;
   a signal-to-noise ratio estimator which combines the compensated finger-based traffic channel signals and estimates at least one signal-to-noise ratio for at least one traffic channel;
   a transmission mode determining circuit which compares the at least one estimated signal-to-noise ratio with a preset threshold value, to detect continuous or discontinuous transmission of the at least one traffic channel based upon a result of the comparison, wherein the at least one signal-to-noise ratio for the at least one traffic channels is estimated using:

$$SNR'_{TCH\text{-}Combined} = fn_P(\text{traffic channel noise, noise power}) +$$
$$fn_Q(PCH \text{ power, noise power}) +$$
$$\sum_{f \neq i}^{F}\sum_{i}^{F} IFSC(f, i \mid c, \text{noise power}) +$$
$$\sum_{f \neq i}^{F}\sum_{i}^{F} IFNC(f, i \mid c, \text{noise power}),$$

wherein IFSC(f, i|c, noise power) indicates Inter-Finger Signal Correlation for noise and traffic channel signal components of respective fingers, and IFNC(f, i|c, noise power) indicates Inter-Finger Noise Correlation for noise components for respective fingers, which are applied with a weight by channel components c.

13. The apparatus according to claim 12, wherein the signal-to-noise ratio estimator is configured to estimate at least one signal-to-noise ratio for traffic channels by processing a square calculation to the combined finger-based traffic channel signals.

14. The apparatus according to claim 12, wherein the transmission mode determining circuit is configured to determine continuous transmission of a traffic channel if an estimated signal-to-noise ratio for the traffic channel is at least a threshold value, and to determine discontinuous transmission of the traffic channel if the estimated signal-to-noise ratio for the traffic channel is smaller than the threshold value.

15. An apparatus for detecting traffic channel signal transmission in a rake receiver, comprising:
   a channel compensator for compensating channels of UWN signals and traffic channel signals according to fingers using estimated pilot channel signals;
   an SNR estimator for combining the compensated finger-based traffic channel signals and the finger-based UWN signals and estimating at least one signal-to-noise ratio for at least one traffic channel and the UWN signals;
   a transmission mode determining circuit which determines continuous or discontinuous transmission of the traffic channels based upon the at least one estimated signal-to-noise ratio, wherein estimating the signal-to-noise ratios for traffic channels estimated by the first SNR estimator comprises using:

$$SNR'_{TCH\text{-}Combined \mid DTX} =$$
$$fn_Q(PCH \text{ power, noise power}) + \sum_{f \neq i}^{F}\sum_{i}^{F} IFNC(f, i \mid c, \text{noise power}).$$

where IFSC(f, i|c, noise power) indicates Inter-Finger Signal Correlation for noise and traffic channel signal components of respective fingers, and IFNC(f, i|c, noise power) indicates Inter-Finger Noise Correlation for noise components for respective fingers, which are applied with a weight by the channel component c.

16. The apparatus according to claim 15, wherein the channel compensator comprises:
   a finger-based traffic channel compensator for compensating the traffic channel signals according to the fingers by using the pilot channel signals estimated according to the fingers; and a finger-based UWN channel compensator for compensating the UWN signals according to the fingers by using the pilot channel signals estimated according to the fingers.

17. The apparatus according to claim 15, wherein the SNR estimator comprises:
first and second combiners for combining the finger-based traffic channel and UWN signals compensated by the channel compensator; and
first and second SNR estimators for estimating signal-to-noise ratios with respect to the traffic channel and UWN signals combined by the first and second combiners, respectively.

18. The apparatus according to claim 17, wherein the signal-to-noise ratios with respect to the traffic channel and UWN signals estimated by the first and second SNR estimators, respectively, are estimated by square-calculating the traffic channel and UWN signals combined in the first and second combiners, respectively.

19. The apparatus according to claim 15, wherein if a signal-to-noise ratio for a traffic channel estimated in the first SNR estimator is of discontinuous transmission, estimating the signal-to-noise ratio for a traffic channel comprises using:

$$SNR'_{UW \cdot Combined} = fn_Q(PCH \text{ power, noise power}) + \sum_{f \neq i}^{F} \sum_{i}^{F} IFNC(f, i \mid c, \text{noise power}).$$

20. The apparatus according to claim 17, wherein estimating the signal-to-noise ratios of the UWN signals estimated in the second SNR estimator comprises using:

$$SNR'_{UW \cdot Combined} = fn_Q(PCH \text{ power, noise power}) + \sum_{f \neq i}^{F} \sum_{i}^{F} IFNC(f, i \mid c, \text{noise power}).$$

21. The apparatus according to claim 17, wherein the transmission mode determining circuit comprises:
a divider which divides the signal-to-noise ratios of the traffic channels estimated by the SNR estimators with the signal-to-noise ratios of the UWN signals; and
a determining section which compares the divided signal-to-noise ratios divided by the divider with a threshold value to detect continuous or discontinuous transmission of the traffic channels based results of the comparison.

22. The apparatus according to claim 21, wherein the determining section is configured to determine continuous transmission of a traffic channel if a divided signal-to-noise ratio is at least the preset threshold value, and to determine discontinuous transmission of the traffic channel if the divided signal-to-noise ratio is smaller than the preset threshold value.

23. An apparatus for detecting traffic channel signal transmission in a rake receiver, comprising:
a pilot channel estimator which estimates received pilot channel signals according to fingers;
a channel compensator which compensates traffic channel signals according to fingers using the pilot channel signals estimated in the pilot channel estimator;
a UWN channel compensator which compensates the UWN signals according to the fingers by using the pilot channel signals estimated according to the fingers;
a first coupler which combines the finger-based traffic channel signals compensated by the channel compensator;
a second coupler which combines the finger-based traffic channel signals compensated by the channel compensator;
a first SNR estimator which estimates signal-to-noise ratios of the traffic channels by square-calculating the traffic channel signals combined by the first combiners, respectively;
a second SNR estimator which estimates signal-to-noise ratios of the traffic channels by square-calculating the traffic channel signals combined by the first combiners, respectively, wherein the estimating of the at least one signal-to-noise ratio for the at least one traffic channel comprises using:

$$SNR'_{TCH \cdot Combined} = fn_p(\text{traffic channel noise, noise power}) +$$
$$fn_Q(PCH \text{ power, noise power}) + \sum_{f \neq i}^{F} \sum_{i}^{F} IFSC(f, i \mid c, \text{noise power}) +$$
$$\sum_{f \neq i}^{F} \sum_{i}^{F} IFNC(f, i \mid c, \text{noise power}),$$

wherein IFSC(f, i|c, noise power) indicates Inter-Finger Signal Correlation for noise and traffic channel signal components of respective fingers, and IFNC(f, i|c, noise power) indicates Inter-Finger Noise Correlation for noise components for respective fingers, which are applied with a weight by channel component c; and
a transmission mode determining circuit which determines continuous or discontinuous transmission of the traffic channels based upon the signal-to-noise ratios estimated by the first and second SNR estimators.

24. The apparatus according to claim 23, wherein the transmission mode determining circuit comprises:
a divider which divides the signal-to-noise ratios of the traffic channels estimated by the first and second SNR estimators with the signal-to-noise ratios of the UWN signals; and
a determining section which compares the divided signal-to-noise ratios with a threshold value to detect continuous or discontinuous transmission of the traffic channels based upon comparison results, and determines continuous transmission of a traffic channel if a divided signal-to-noise ratio is at least the preset threshold value and discontinuous transmission of the traffic channel if the divided signal-to-noise ratio is smaller than the preset threshold value.

* * * * *